(12) United States Patent
Doyle

(10) Patent No.: US 8,189,120 B2
(45) Date of Patent: May 29, 2012

(54) NON-PROGRAMMABLE UNIVERSAL REMOTE SYSTEM AND METHOD

(75) Inventor: Paul Doyle, San Marcos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 727 days.

(21) Appl. No.: 12/365,274

(22) Filed: Feb. 4, 2009

(65) Prior Publication Data

US 2010/0195001 A1    Aug. 5, 2010

(51) Int. Cl.
*H04N 5/44* (2011.01)
(52) U.S. Cl. ........................... 348/734; 348/552
(58) Field of Classification Search .............. 348/734, 348/725, 563, 564, 569, 552–555; 340/12.22, 340/13.24, 13.25, 12.3, 12.23, 825, 825.69, 340/572.1; *H04N 5/44*
See application file for complete search history.

(56) References Cited

U.S. PATENT DOCUMENTS

| | | | | |
|---|---|---|---|---|
| 6,121,959 | A * | 9/2000 | Fukumoto et al. | 345/173 |
| 6,160,491 | A * | 12/2000 | Kitao et al. | 340/12.28 |
| 7,116,229 | B1 | 10/2006 | Miramontes | |
| 7,315,985 | B1 * | 1/2008 | Gauvin et al. | 715/734 |
| 7,827,319 | B2 * | 11/2010 | Kimura et al. | 710/5 |
| 7,973,648 | B2 * | 7/2011 | Kawakita | 340/13.24 |
| 2003/0110512 | A1 | 6/2003 | Maari | |
| 2003/0130906 | A1 | 7/2003 | Maari | |
| 2004/0066308 | A1 | 4/2004 | Sampsell | |
| 2004/0070491 | A1 | 4/2004 | Huang et al. | |
| 2004/0070497 | A1 | 4/2004 | Laurosch et al. | |
| 2004/0073451 | A1 | 4/2004 | Maari | |
| 2004/0107167 | A1 | 6/2004 | Maari | |
| 2005/0015467 | A1 | 1/2005 | Noda | |
| 2005/0024226 | A1 | 2/2005 | Hayes et al. | |
| 2005/0273181 | A1 | 12/2005 | Peng et al. | |
| 2006/0095596 | A1 | 5/2006 | Yung et al. | |
| 2006/0197676 | A1 | 9/2006 | Smith | |
| 2006/0252030 | A1 | 11/2006 | In-Jae et al. | |
| 2007/0024462 | A1 | 2/2007 | Kitaura | |
| 2007/0024463 | A1 | 2/2007 | Hall et al. | |
| 2007/0126576 | A1 | 6/2007 | Script et al. | |
| 2008/0088474 | A1 | 4/2008 | Hardacker | |
| 2008/0088495 | A1 | 4/2008 | Kawakita | |
| 2008/0231492 | A1 | 9/2008 | Hardacker et al. | |
| 2008/0231762 | A1 | 9/2008 | Hardacker et al. | |

FOREIGN PATENT DOCUMENTS

WO    01/71685    9/2001

OTHER PUBLICATIONS

Bob O'Donnell, "HDMITM: The Digital Display Link", http://www.hdmi.com/pdf/whtiepaper/SilicaonImageHDMIWhitePaperv73(2).pdf, Dec. 2006.

(Continued)

*Primary Examiner* — Trang U Tran
(74) *Attorney, Agent, or Firm* — John L. Rogitz; John M. Rogitz

(57) ABSTRACT

A TV detects the capabilities of connected components to respond to various function commands. Subsequently, when a non-programmable remote control is used to select a component and then generate a function command, the TV determines if the component can respond to the command and if not, the TV dynamically alters the commanded function or the selected component.

19 Claims, 1 Drawing Sheet

OTHER PUBLICATIONS

Joseph L. Lias, "HDMI Consumer Electronic Control (CEC) technology and testing", http://www.videsignline.com/howto/207400325;jsessionid=TANMBENIIC4AIQSNDLRCKHOCJUNN2JVN?pgno=2, Apr. 18, 2008.

Logitech Harmony Advanced Universal Remote 720 brochure.

Logitech Products web page for Harmony Remote Control, www.logitech.com/index.cfm.products/features/harmonytopics/US/en,CRID=2079, printed Feb. 23, 2007.

Robert Hardacker, "System and Method for Informing User How t Use Universal Remote Control", File History of pending U.S. Appl. No. 11/541,272.

Robert Hardacker, "System and Method for Application Dependent Universal Remote Control", File History of pending U.S. Appl. No. 11/726,560.

Robert Hardacker, Rolf Toft, Ryuichi Iwamura, "System and Method for Application Dependent Universal Remote Control", File History of pending U.S. Appl. No. 11/970,858.

* cited by examiner

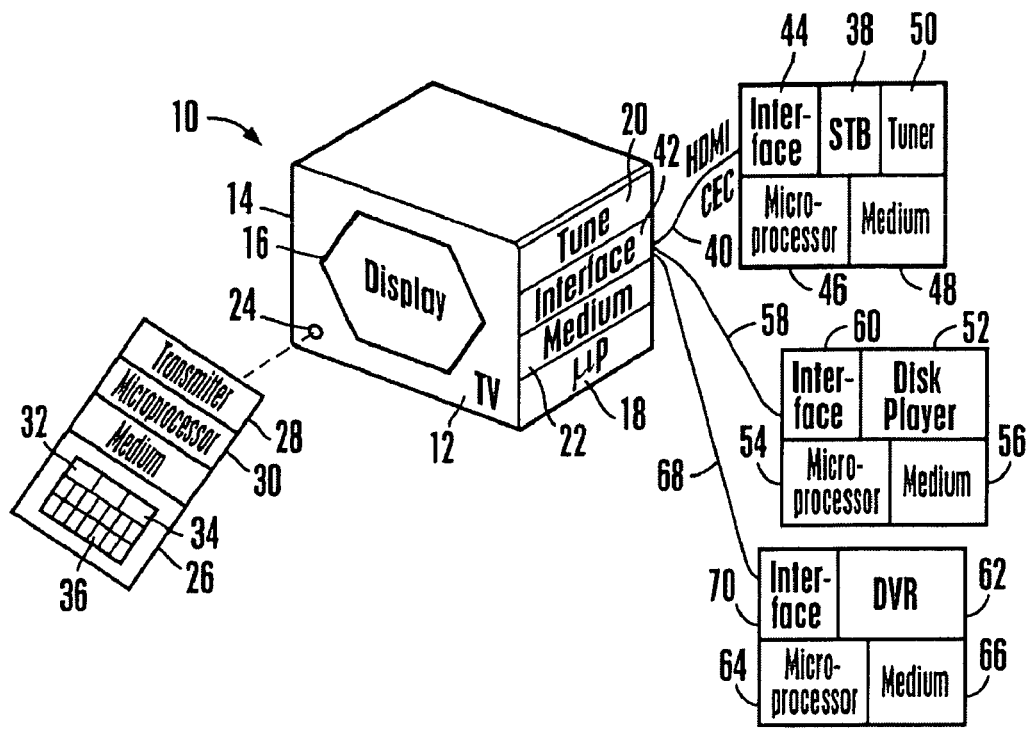
FIG. 1
FIG. 2 setup
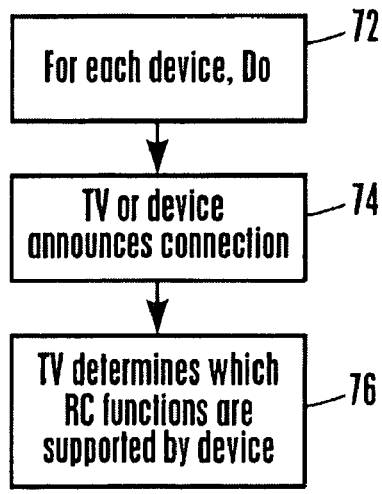
FIG. 3 operation
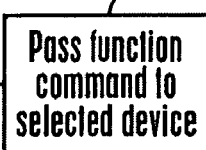
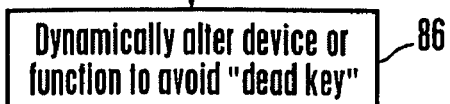

NON-PROGRAMMABLE UNIVERSAL REMOTE SYSTEM AND METHOD

FIELD OF THE INVENTION

The present invention relates generally to using non-programmable remote controls to control not only a TV but also peripheral components.

BACKGROUND OF THE INVENTION

As home entertainment components multiply, so do the remote control devices that accompany them. In an effort to limit the number of remotes a viewer must juggle to control his various components, programmable remote controls have been introduced that may be programmed with the various command codes used by various components, so that a single remote control can be aimed at whatever component the viewer wants to control and then manipulated to send the desired command to the component.

SUMMARY OF THE INVENTION

As understood herein, requiring a viewer to program a remote control is a nuisance to the consumer.

Accordingly, a method is disclosed that includes, at a TV processor associated with a TV, learning capabilities of at least a first audio/video component connected to the TV via a digital communication path to respond to functions represented by respective desired function signals generated by a remote control device. The method also includes receiving at the TV processor a component select signal from the remote control device. The component select signal designates the first component as being selected as audio/video input source to the TV. The TV processor also receives a desired function signal from the remote control device that represents a desired function, and then the TV processor determines whether the first component can execute the desired function based on the previously learned capabilities. If the first component can execute the desired function, a signal is sent from the TV to the first component via the digital communication path commanding the first component to execute the desired function. On the other hand, if the first component cannot execute the desired function, the selected component or the desired function is automatically changed without command from the remote control.

In an example embodiment the communication path is a consumer electronics control (CEC) bidirectional path, and the first component sends audio/video information to the TV via a high definition multimedia interface (HDMI) link. In some implementations the TV can learn capabilities of a second audio/video component communicating with the TV over a bidirectional digital communication link.

The desired function may be a channel change command and if the first component does not support the desired function, the TV processor can change the selected component to the TV to cause the TV to change channel. As another example, the desired function can be a "jump to last-selected channel" command and if the first component does not support the desired function, the TV processor can automatically change input source to the TV from the first component to a last-selected component. The remote control device may be non-programmable.

In another aspect, a home system includes a non-programmable remote control manipulable to send wireless signals to a TV processor in a TV. The wireless signals include selected component signals and desired function signals. A TV receives the wireless signals. Plural audio/video components communicate with the TV over respective digital communication links. The TV presents audio/video information from a component indicated by a selected component signal. Also, the TV causes the component indicated by the selected component signal to execute a function indicated by a desired function signal if the component indicated by a selected component is capable of executing the desired function. Otherwise, the TV automatically changes audio/video input to a source other than the selected component.

In another aspect, a computer-readable medium bears instructions that are readable by a TV processor to learn, without user interaction, respective capabilities of audio/video components communicating with the TV processor to undertake commanded functions. The instructions cause the TV processor to receive a first wireless signal from a remote control designating a first one of the components as input source to a TV display associated with the TV processor, and to receive a second wireless signal from the remote control corresponding to a desired function. If the first component has capability to execute the desired function, the instructions cause the TV processor to relay a signal to the first component to cause the first component to execute the desired function. Otherwise, the TV processor does not attempt to cause the first component to execute the desired function.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an example system in accordance with present principles;

FIG. 2 is a flow chart of example set up logic which may be embodied as instructions on one or more of the computer readable media disclosed herein; and FIG. 3 is a flow chart of example operating logic which maybe embodied as instructions on one or more of the computer readable media disclosed herein.

DETAILED DESCRIPTION OF THE PREFERRED EMBODIMENT

Referring initially to FIG. 1, a system 10 includes a TV system 12 that in one implementation includes a TV chassis 14 holding a TV display 16 such as a standard definition and/or high definition display, e.g., a matrix-type flat panel display. The display 16 under control of a TV processor 18 in the chassis 14 presents signals from a TV tuner 20 in the chassis 14, it being understood that the above components may be implemented in concert with, e.g., a set-top box.

The processor 18 accesses a computer-readable medium 22 such as solid state storage or disk-based storage. The processor 18 can receive, via a wireless IR or RF or other wireless receiver 24, wireless user command signals generated by a remote control 26. Accordingly, the remote control 26 may include a wired or more typically wireless transmitter or transceiver 28 controlled by a RC processor 30 to send to the TV component select signals such as a "select DVR function" signal that is generated when a user manipulates a DVR select key 32. Other component selects keys 34 including keys to select "set top box", "disk player", "TV", etc. may be provided. Along with the component select keys 32, 34, the remote control 26 includes various function keys 36 such as "stop", "fast forward", "reverse", "skip", etc., to cause a video under control to respectively stop, play forward at a faster than normal speed, play in reverse, and skip over entire segments, "jump" (sometimes referred to as "last") to cause an immediately previously presented channel number to be presented again, volume up/down, channel up/down, reverse, fast forward, etc.

In example embodiments the remote control 26 is non-programmable. "Non-programmable" means that the end user cannot input command codes to the remote control to enable it to generate signals recognized by components other than the TV.

In one implementation the system 10 may include an internet capable set top box (STB) 38 that may be connected to the TV using a digital communication link such as a high definition multimedia interface (HDMI) link 40, which maybe a wired link. Accordingly, the TV 12 includes an appropriate communication interface 42 such as an HDMI interface (which also supports consumer electronics control (CEC) bidirectional data communication) and the STB 38 likewise includes a complementarily configured interface 44 such that information may be exchanged over the link 40 using the interfaces 42, 44.

The STB 38 includes a STB processor 46 accessing a computer-readable storage medium 48 and a TV tuner 50 for receiving incoming TV signals from a source such as a cable head end, satellite, terrestrial antenna, etc. The STB processor 46 communicates with the STB interface 44.

Other components may also be provided and may communicate audio/video information over respective HDMI links to the TV for display thereof as well as communicate data over the CEC portion of the HDMI interface. For example, a disk player 52 such as a Blu-Ray disk player can have a disk player processor 54 communicating with one or more data storage media 56 such as optical disks. The disk player processor 54 may control the disk player 52 to communicate audio/video programs on the medium 56 to the TV 12 via a HDMI link 58, and to this end the processor 54 may access an appropriately configured HDMI/CEC interface 60 as shown, which is connected via the link 58 to the interface 42 of the TV 12.

Also, a digital video recorder (DVR) 62 can have a DVR processor 64 communicating with one or more data storage media 66 such as hard disk drives. The DVR processor 64 may control the DVR 62 to communicate audio/video programs on the medium 66 to the TV 12 via a HDMI link 68, and to this end the processor 64 may access an appropriately configured HDMI/CEC interface 70 as shown, which is connected via the link 68 to the interface 42 of the TV 12.

With the above example system in mind, attention is directed to FIG. 2. Commencing at block 72, for each component 38, 52, 62, the logic moves to block 74 wherein the TV 12 determines or the component announces to the TV that the component is connected. Then, at block 76 the TV processor 18 determines which functions that can be commanded using the remote control 26 are supported by the component. To do this, the TV can either query the component for the functional capabilities it supports or the component can announce the functional capabilities it supports to the TV. Or, the TV can determine the classification of the component and then access a data structure to correlate the classification to supported functions. Communication of the information discussed above may be on the CEC portion of the link between the component and the TV. For example, the disk player 52 can announce to the TV 12 that it supports Transport Control functions such as: "Play" "Stop" etc. Command codes corresponding to the supported functions of the component are also learned and used to relay remote control commands from the TV to the component as described below. Links other than CEC may be used in alternate embodiments.

In operation, at block 78 of FIG. 3 a viewer can select a component to control by manipulating an appropriate one of the component selects keys 32, 34 on the remote control 26. A corresponding component select signal is received by the TV processor 18 at block 78 via the wireless interface 24. The viewer then presses, at block 80, the function key 36 corresponding to the function the viewer desires the selected component to perform, and the corresponding function command is received by the TV processor 18 at block 80. The signals are received by the TV 12 but not by the other components 38, 52, 62, which, recall, do not communicate directly with the remote control 26.

At decision diamond 82, the TV processor 18 determines whether the selected component supports the selected function. If it does, at block 84 the TV sends a signal (via the CEC path) to the selected component to execute the selected function. For example, if the disk player 52 is the selected component and the command is a function such as "play", "stop", etc. that is supported by the disk player, the function command is communicated from the TV 12 to the disk player 52 via the CEC link, which responds accordingly. As another example, if the selected component is the STB 38 and the STB supports tuning functions such as "channel up/down", "jump" etc., and the viewer selects one of these tuning functions, the STB 38 receives the command from the TV 12 and responds accordingly.

On the other hand, if the TV processor 18 determines at decision diamond 82 that the selected component does not support the commanded function, the logic moves to block 86 to dynamically alter either the selected device or the selected function to avoid what would otherwise be a "dead key" situation in which nothing happens when a viewer presses a function key that is not supported by a selected component. As an example, if the STB 38 does not support tuning functions, either the selected component is changed or the function itself is changed when a tuning function command is received with the STB as the selected component. Thus, a channel up command is used by the TV 12 itself to cause its TV tuner 20 to tune one channel up, thereby altering the selected component. If a channel "jump" command is received, the TV 12 might be caused to execute the command itself, thereby altering the selected component, or input to the TV may be changed (and thereby "jump") to the previously selected component such as the DVR 62, thereby altering the commanded function (in this case, from "jump to last-selected channel" to "jump to last-selected component") as interpreted by the TV although having the same base signal from the remote control 26. Yet again, if the selected component does not support a "jump" command the TV processor might automatically switch to a component that does support such a command.

While the particular NON-PROGRAMMABLE UNIVERSAL REMOTE SYSTEM AND METHOD is herein shown and described in detail, it is to be understood that the subject matter which is encompassed by the present invention is limited only by the claims.

What is claimed is:

1. Method comprising:
   at a TV processor associated with a TV, learning capabilities of at least a first audio/video component connected to the TV via a digital communication path to respond to functions represented by respective desired function signals generated by a remote control device;
   receiving at the TV processor a component select signal from the remote control device, the component select signal designating the first component as being selected as audio/video input source to the TV;

receiving at the TV processor a desired function signal from the remote control device, the desired function signal representing a desired function;

determining at the TV processor whether the first component can execute the desired function based on the learning act;

if the first component can execute the desired function, sending a signal from the TV to the first component via the digital communication path commanding the first component to execute the desired function;

if the first component cannot execute the desired function, automatically changing, without command from the remote control, the selected component or the desired function.

2. The method of claim 1, wherein the communication path is a consumer electronics control (CEC) bidirectional path.

3. The method of claim 1, wherein the first component sends audio/video information to the TV via a high definition multimedia interface (HDMI) link.

4. The method of claim 1, wherein the TV learns capabilities of a second audio/video component communicating with the TV over a bidirectional digital communication link.

5. The method of claim 1, wherein the desired function is a channel change command and the first component does not support the desired function, and the TV processor changes the selected component to the TV to cause the TV to change channel.

6. The method of claim 1, wherein the desired function is a "jump to last-selected channel" command and the first component does not support the desired function, and the TV processor automatically changes input source to the TV from the first component to a last-selected component.

7. The method of claim 1, wherein the remote control device is non-programmable.

8. Home system comprising:

non-programmable remote control manipulable to send wireless signals to a TV processor in a TV, the wireless signals including selected component signals and desired function signals;

TV receiving the wireless signals; and plural audio/video components communicating with the TV over respective digital communication links, the TV presenting audio/video information from a component indicated by a selected component signal, the TV causing the component indicated by the selected component signal to execute a function indicated by a desired function signal if the component indicated by a selected component is capable of executing the desired function, the TV otherwise automatically changing audio/video input to a source other than the selected component.

9. The home system of claim 8, wherein the communication link is a consumer electronics control (CEC) bidirectional path.

10. The home system of claim 8, wherein a selected component sends audio/video information to the TV via a high definition multimedia interface (HDMI) link.

11. The home system of claim 8, wherein the desired function is a channel change command and the selected component does not support the desired function, and the TV processor changes the selected component to the TV to cause the TV to change channel.

12. The home system of claim 8, wherein the desired function is a "jump to last-selected channel" command and the selected component does not support the desired function, and the TV processor automatically changes input source to the TV to a last-selected component.

13. A non-transitory computer-readable medium bearing instructions readable by a TV processor to:

without user interaction, learn respective capabilities of audio/video components communicating with the TV processor to undertake commanded functions;

receive a first wireless signal from a remote control designating a first one of the components as input source to a TV display associated with the TV processor;

receive a second wireless signal from the remote control corresponding to a desired function;

if the first component has capability to execute the desired function, relay a signal to the first component to cause the first component to execute the desired function, and otherwise not attempt to cause the first component to execute the desired function.

14. The non-transitory computer-readable medium of claim 13, wherein the remote control is non-programmable.

15. The non-transitory computer-readable medium of claim 13, wherein if the first component does not have capability to execute the desired function, the instructions cause the TV processor to automatically change, without command from the remote control, the component indicated by the first signal or the desired function indicated by the second signal.

16. The non-transitory computer-readable medium of claim 13, wherein the TV processor communicates with the components over consumer electronics control (CEC) bidirectional paths.

17. The non-transitory computer-readable medium of claim 13, wherein the components send audio/video information to the TV processor via a high definition multimedia interface (HDMI) link.

18. The non-transitory computer-readable medium of claim 15, wherein the desired function is a channel change command and if the first component does not support the desired function, the TV processor changes the selected component to the TV to cause the TV to change channel.

19. The non-transitory computer-readable medium of claim 15, wherein the desired function is a "jump to last-selected channel" command and if the first component does not support the desired function, the TV processor automatically changes input source to the TV from the first component to a last-selected component.

* * * * *